United States Patent
Bares et al.

(10) Patent No.: US 9,556,597 B2
(45) Date of Patent: Jan. 31, 2017

(54) FAUCET WITH SPRAY HEAD

(71) Applicant: Kohler Co., Kohler, WI (US)

(72) Inventors: William R. Bares, Fredonia, WI (US); Perry D. Erickson, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 14/746,625

(22) Filed: Jun. 22, 2015

(65) Prior Publication Data

US 2015/0322650 A1    Nov. 12, 2015

Related U.S. Application Data

(63) Continuation of application No. 12/110,383, filed on Apr. 28, 2008, now Pat. No. 9,062,438.

(60) Provisional application No. 60/916,338, filed on May 7, 2007.

(51) Int. Cl.
*E03C 1/04* (2006.01)

(52) U.S. Cl.
CPC .............. *E03C 1/04* (2013.01); *E03C 1/0403* (2013.01); *E03C 2001/0415* (2013.01); *Y10T 137/86815* (2015.04); *Y10T 137/9464* (2015.04)

(58) Field of Classification Search
USPC ................. 4/677, 676, 372; 137/801, 615
See application file for complete search history.

(56) References Cited

U.S. PATENT DOCUMENTS

| | | | |
|---|---|---|---|
| 4,101,989 | A | 7/1978 | Lagarelli |
| 4,589,445 | A | 5/1986 | Aguilar et al. |
| 5,048,792 | A | 9/1991 | Fischer |
| 5,082,023 | A | 1/1992 | D'Alayer de Costemore d'Arc |
| 5,381,830 | A | 1/1995 | Niemann et al. |
| 5,575,424 | A * | 11/1996 | Fleischmann ............ E03C 1/04 137/218 |
| 5,613,521 | A | 3/1997 | Knapp |
| 6,199,586 | B1 | 3/2001 | Pawelzik et al. |
| 6,273,123 | B1 | 8/2001 | Keefer et al. |
| 6,289,531 | B1 | 9/2001 | Kahle et al. |
| 6,371,163 | B1 | 4/2002 | Kahle et al. |
| 6,390,125 | B2 | 5/2002 | Pawelzik et al. |
| D458,354 | S | 6/2002 | Watson |
| 6,435,212 | B2 | 8/2002 | Brandebusemeyer |
| 6,530,606 | B2 | 3/2003 | Lehner |
| 6,729,349 | B2 | 5/2004 | Brandebusemeyer |
| 6,757,921 | B2 | 7/2004 | Esche |
| 6,786,240 | B2 | 9/2004 | Ouyoung |
| 6,868,564 | B2 | 3/2005 | Ginter et al. |

(Continued)

FOREIGN PATENT DOCUMENTS

| | | |
|---|---|---|
| EP | 1008695 | 6/2000 |
| ES | 1044767 | 6/2000 |
| WO | WO-2008/137034 | 11/2008 |

*Primary Examiner* — Lauren Crane
(74) *Attorney, Agent, or Firm* — Foley & Lardner LLP

(57) ABSTRACT

Disclosed is a swivel faucet, such as one having a pull-out sprayer. In one aspect the inlet and outlet lines are formed in an integral structure with a transverse plate that faces a mixing valve. In another aspect the control handle for the faucet is provided with a concentric visible bore and hidden set screw bore combined with a bushing having a cutout to facilitate their use. In still another aspect there is provided a bearing that mounts to a pivotable sprayer and provides distinct swivel positions through the use of a detent connection to a land.

10 Claims, 9 Drawing Sheets

(56) References Cited

U.S. PATENT DOCUMENTS

| | | |
|---|---|---|
| 7,032,619 B2 | 4/2006 | Gaenzle |
| 7,140,561 B2 | 11/2006 | Heren et al. |
| 7,533,683 B2 | 5/2009 | Ortega et al. |
| 2002/0021565 A1 | 2/2002 | Alvey |
| 2003/0140413 A1 | 7/2003 | Ginter et al. |
| 2004/0010848 A1* | 1/2004 | Esche .................. E03C 1/04 4/675 |
| 2006/0157127 A1* | 7/2006 | Bors .................. E03C 1/0404 137/801 |
| 2008/0256702 A1 | 10/2008 | Yeh |

\* cited by examiner

FAUCET WITH SPRAY HEAD

CROSS-REFERENCE TO RELATED PATENT APPLICATIONS

This application is a Continuation of U.S. Patent application Ser. No. 12/110,383, which was filed Apr. 28, 2008, which claims priority to and the benefit of U.S. Provisional Patent Application No. 60/916,338, filed May 7, 2007. The entire disclosures of U.S. Patent Application No. 12/110,383 and U.S. Provisional Patent Application No. 60/916,338 are incorporated herein by reference.

STATEMENT OF FEDERALLY SPONSORED RESEARCH OR DEVELOPMENT

Not applicable.

BACKGROUND OF THE INVENTION

This invention relates generally to faucets with spray heads. More particularly it relates to such a faucet in which there is a pull-out sprayer mounted on a swivelable harbor.

In one aspect of known faucets with spray heads/handles, prior designs (e.g. as shown in U.S. Pat. No. 6,757,921) include a separate elbow which is linked at its lower end to inlet hot and cold lines and an outlet line, and to a mixing valve at its vertical side which is connected to an actuation handle. This required the outer housing to bulge in order to accommodate the elbow plus the other relevant connections, and thus created design constraints. It is desirable to have a more compact assembly for connecting the inlet and outlet lines to a side mounted mixing valve.

In another aspect of known faucets with spray heads/handles, prior designs included a control handle with an exposed set screw which could be inadvertently loosened or corroded by water, and/or reduced the aesthetic appeal of the handle. Some of these handles were also formed with an unsightly visible cutaway to permit tilting of the handle to occur (e.g. the valve required both rotation and tilting motion of a control lever). Hence, it is also desirable to improve the exterior aesthetics of such control handles without compromising functionality.

In yet another aspect of known faucets with spray heads/handles, prior designs had a "harbor" for the pull-out spray, the harbor then being swingable like a standard kitchen faucet. When the housings for the harbor or valve base were non-circular in cross section, it became somewhat difficult to easily align the parts to the forward position between uses. U.S. patent application publication 2006/0157127 sought to address this concern. However, it had a variety of deficiencies, such as placing a wear point on the spout hub, which could result in the need to replace an expensive outer part.

Thus, there is a desire to improve various aspects of such faucet assemblies.

SUMMARY OF THE INVENTION

In one aspect the invention provides a faucet assembly having a mixing valve and an inlet/outlet assembly connected to the mixing valve. The inlet/outlet assembly has inlet and outlet lines that are permanently affixed to a face plate (e.g. integrally formed therewith or welded/brazed thereto), particularly where the face plate is positioned transverse to the longitudinal axis of the lines.

In another aspect the invention provides a mixing valve with a valve stem and a control handle connected thereto. The control handle has a set screw bore separated from a visible bore. The visible bore provides access to a set screw within the set screw bore which attaches an inner wall of the handle to the valve stem, while the visible bore extends through an outer wall of the handle. The visible bore is circumferentially aligned with the set screw bore.

In this form of the invention there can be a cap which removably covers the visible bore, such as by using an O-ring to help seal the bore. The handle can have a lever arm that extends radially outward from a side of the handle, and the visible bore can be positioned at an opposed side of the handle from the lever arm.

In yet another preferred form of the invention there can be a bushing with a cutout that is mounted at least in part between the control handle and the mixing valve. This cutout can have a continuous contour (e.g. a keyhole shape) which provides a clearance access to the set screw at a plurality of angular positions of the valve stem.

In still another form the invention provides a faucet assembly with a spray head harbor having an inner contour. There is a bearing having an outer contour and a base, the outer contour being mateable with the inner contour of the spray head harbor, the base including one of a projection and a detent. There is also a valve housing including a shaft extending from a land for the base, the land having another of the projection and the detent.

The bearing is rotatable on the shaft between a position where the projection is within the detent, and another position where the projection is not within the detent. In a preferred form of this aspect of the invention one of the projection and the detent are connected to a spring arm, and the positioning of the detent and projection are such as to define a properly aligned forwardly directed position for the faucet between uses.

The present invention has, in various embodiments, various advantages. For example, one embodiment will provide a compact configuration for the outer housing adjacent the linkage between the control valve and inlet and outlet lines. Another embodiment provides a decorative handle exterior, while still providing set screw access. Still another embodiment can provide positive selection feel when positioning the swivel, particularly when the spout harbor is being returned to its forwardly directed rest position.

These advantages are achieved in an inexpensive manner (both with respect to cost of production of the parts and cost of assembly). Further, the parts used to achieve the assembly are believed to have good reliability over a prolonged period.

These and still other advantages and features of the present invention will be apparent from the following and the attached drawings. Of course, the following discussions relates only to preferred embodiments. For a more comprehensive understanding of the full intended scope of the invention one should look to the claims.

DETAILED DESCRIPTION OF THE PREFERRED EMBODIMENT

Figure 1:
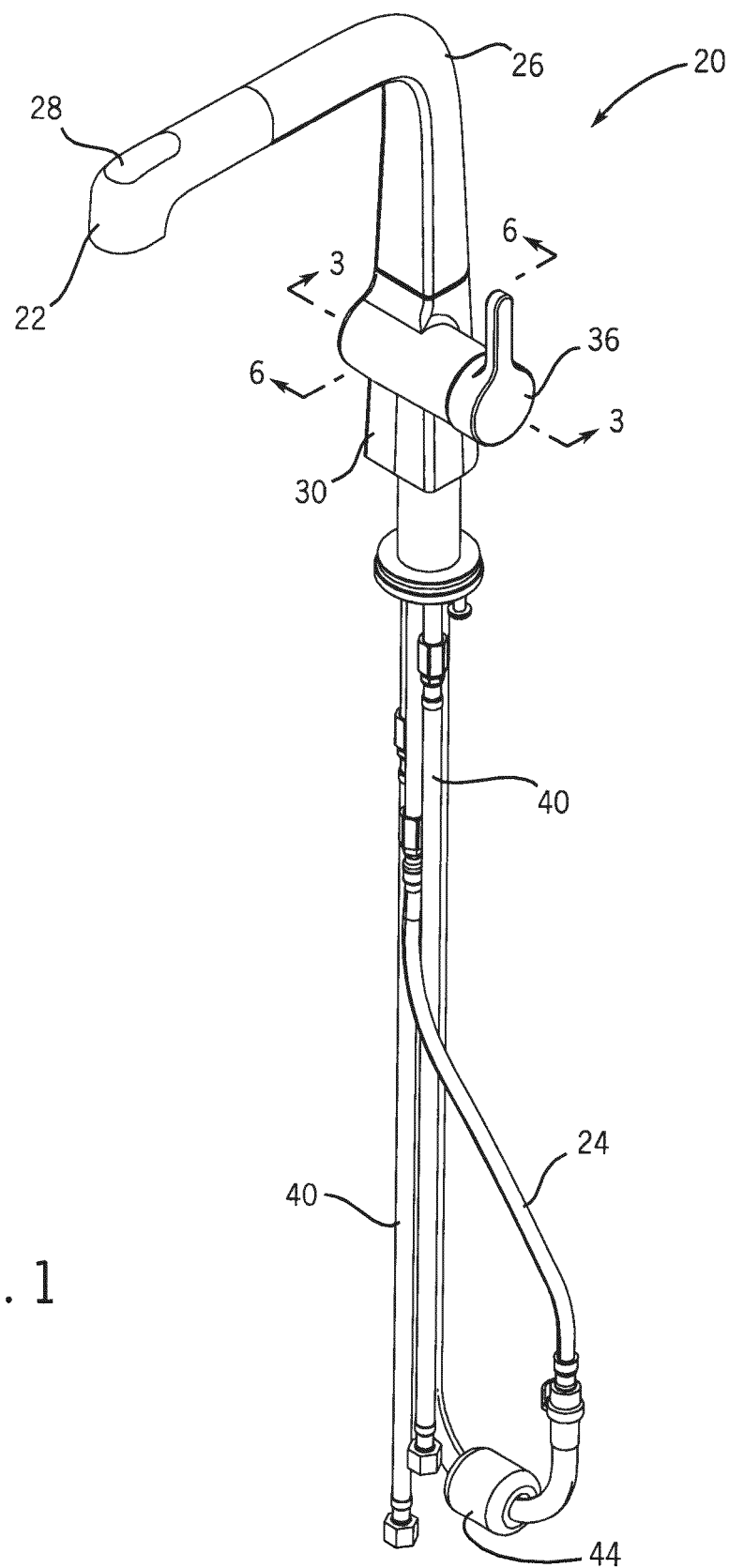
FIG. 1 is a perspective view of a first embodiment of a faucet assembly according to the present invention.
Figure 2:
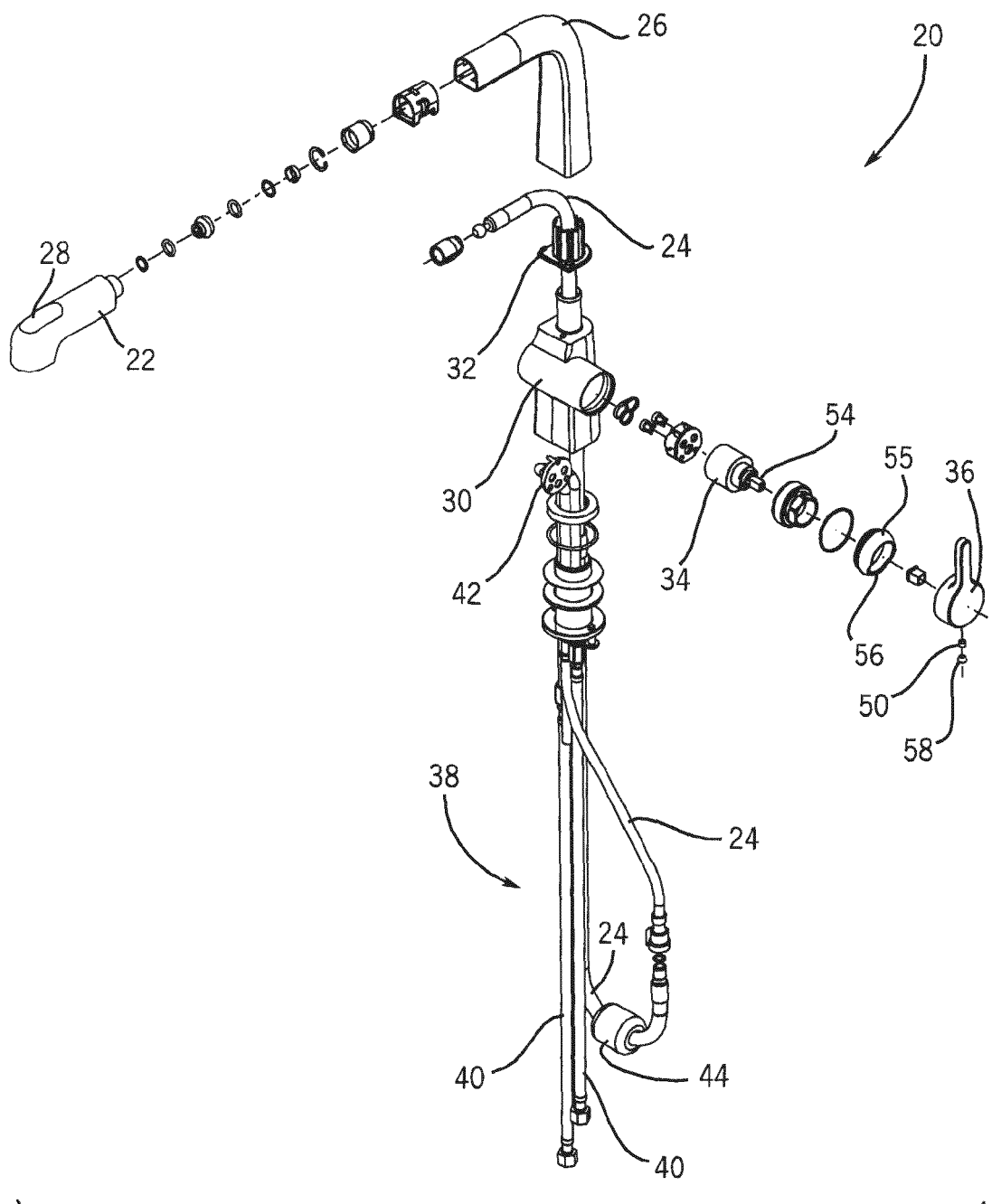
FIG. 2 is an exploded perspective view of the faucet assembly of FIG. 1.
Figure 11:
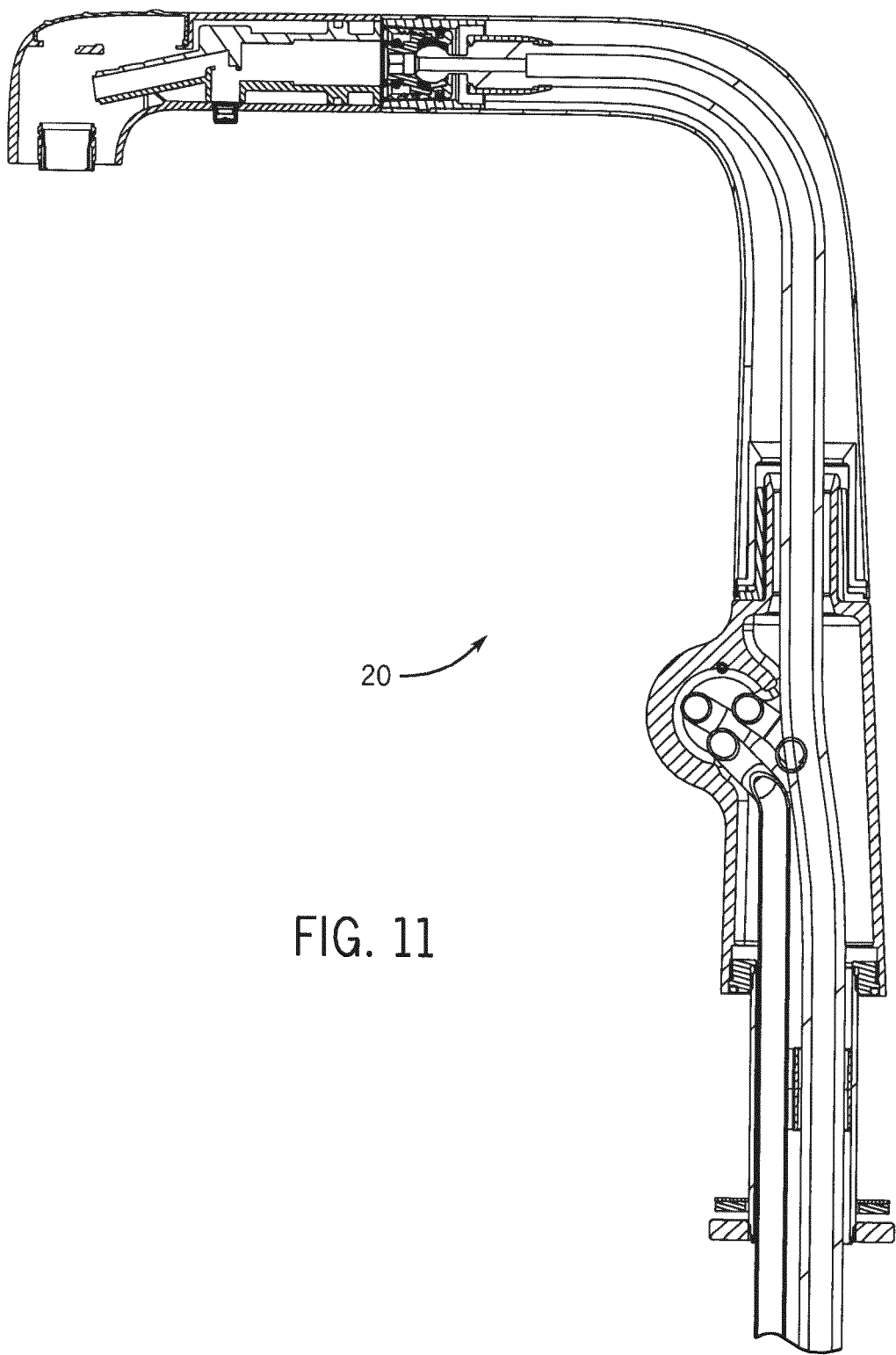
FIG. 11 is a vertical sectional view of the FIG. 1 faucet assembly.
Figure 14:
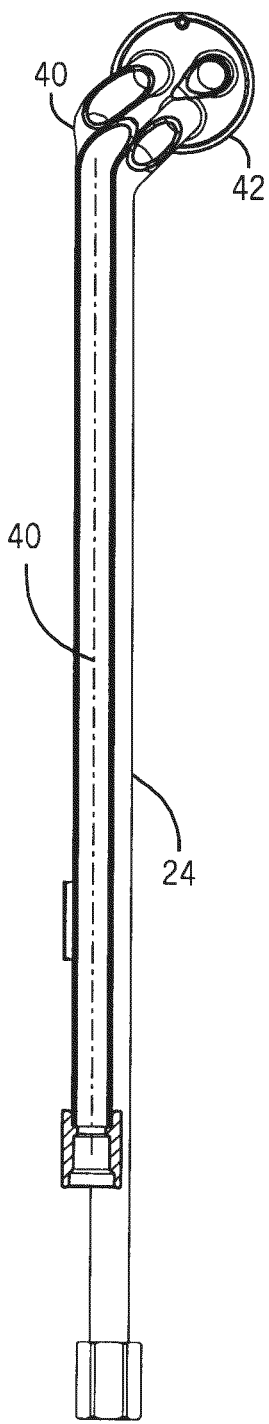
FIG. 14 is a rear view of the FIG. 5 inlet/out assembly.
Figure 13:
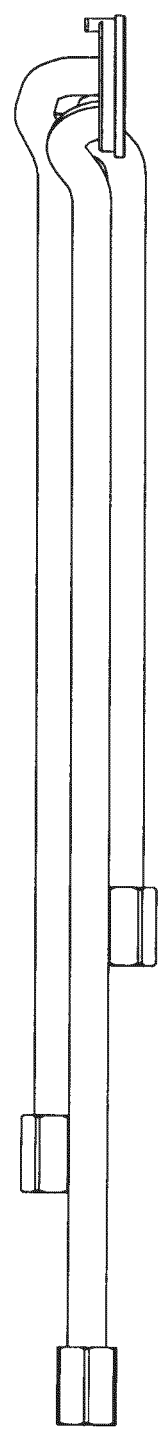
FIG. 13 is a side view of the FIG. 5 inlet/outlet assembly.
Figure 12:
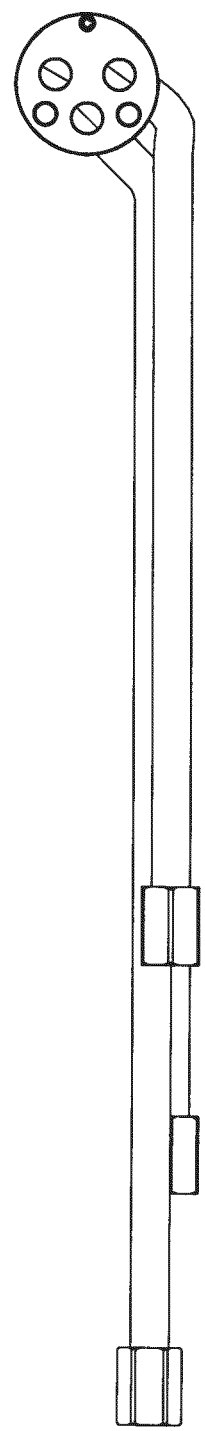
FIG. 12 is a frontal view of a FIG. 5 inlet/outlet assembly.
Figure 15:
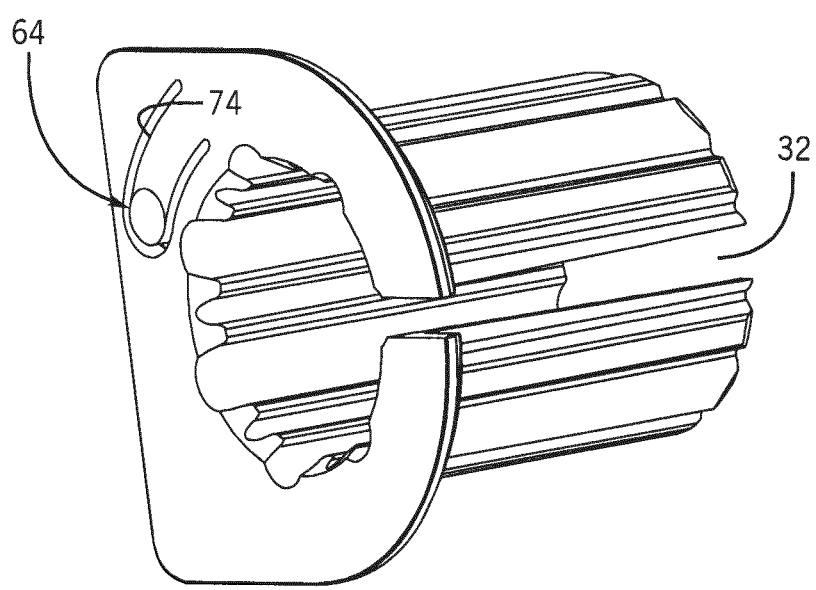
FIG. 15 is a perspective view of a bearing of the FIG. 1 faucet assembly.

Referring now to the drawings, and more particularly first to FIGS. 1, 2 and 11, there is shown a faucet assembly 20 which includes spray head 22 connected to a flexible outlet line 24 which is routed through spray head harbor 26. Spray head 22 may optionally include a spray control pushbutton 28, and may also include other controls. Spray head harbor 26 is connected to valve housing 30 via bearing 32.

Figure 3:
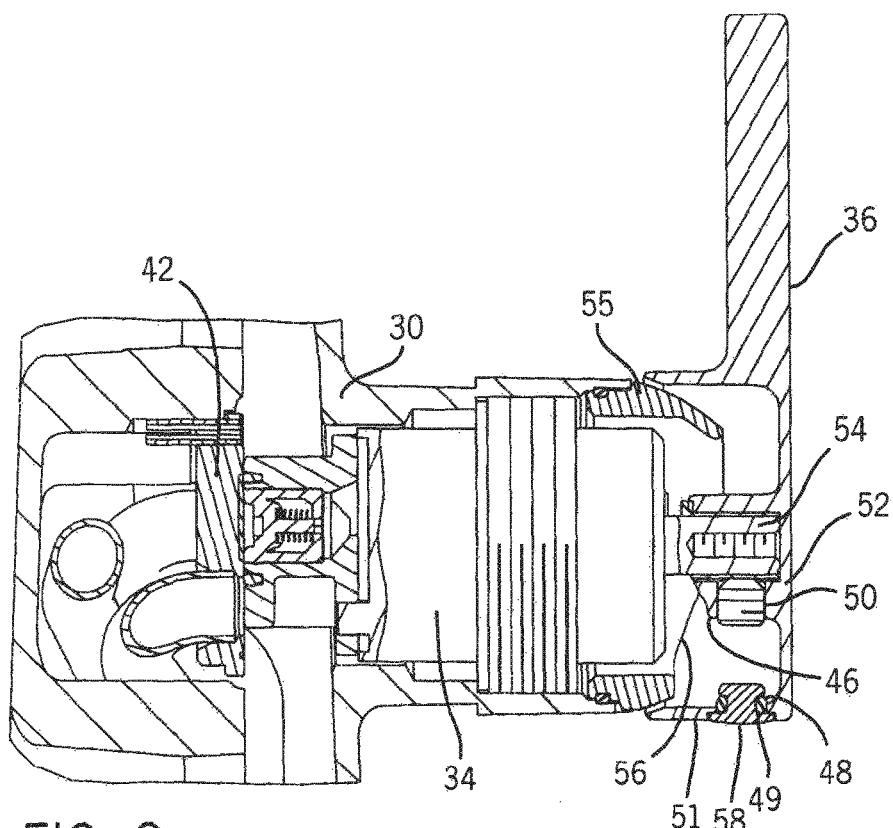
FIG. 3 is a cross-sectional view taken along section line 3-3 in FIG. 1.
Figure 4:
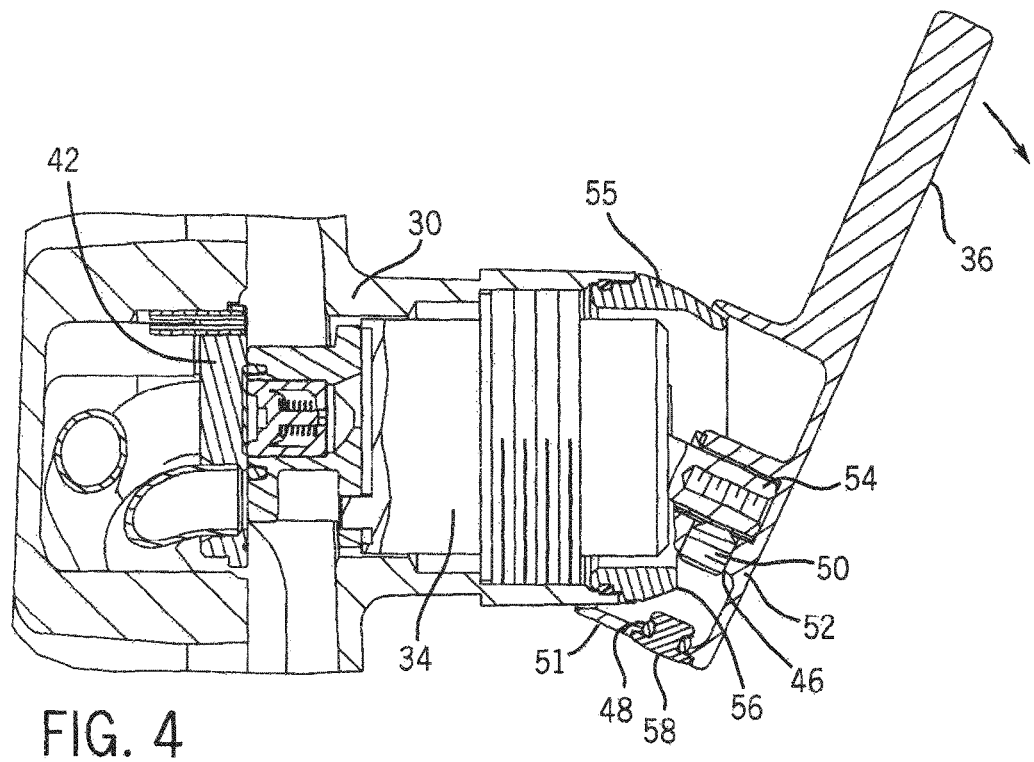
FIG. 4 is a cross-sectional view similar to FIG. 3, but with a control handle tilted to another position.
Figure 5:
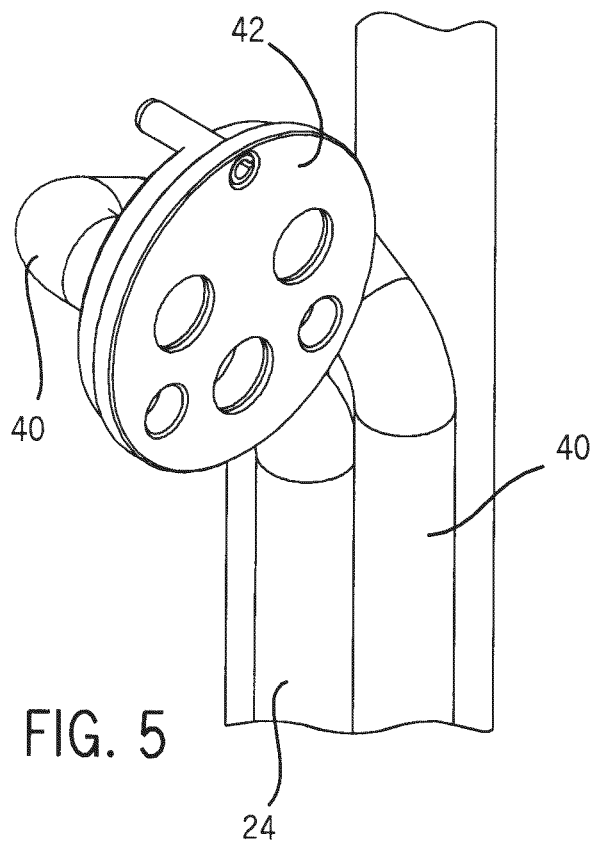
FIG. 5 is a fragmentary perspective view of an inlet/outlet assembly used with the FIG. 1 faucet assembly.
Figure 6:
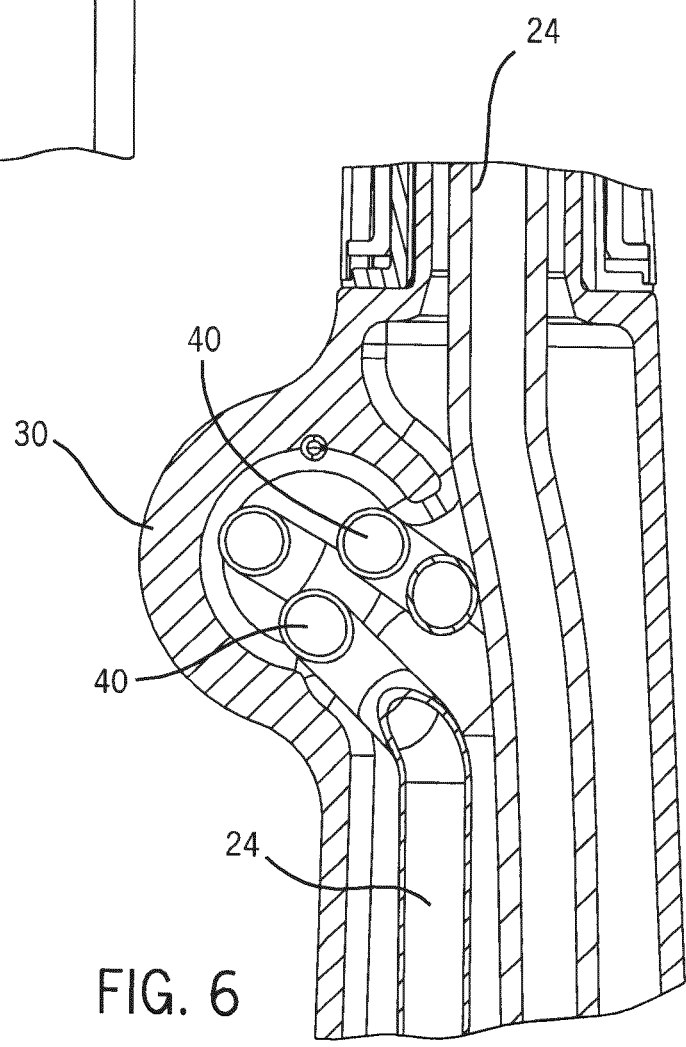
FIG. 6 is a cross-sectional view taken along section line 6-6 of FIG. 1.
Figure 7:
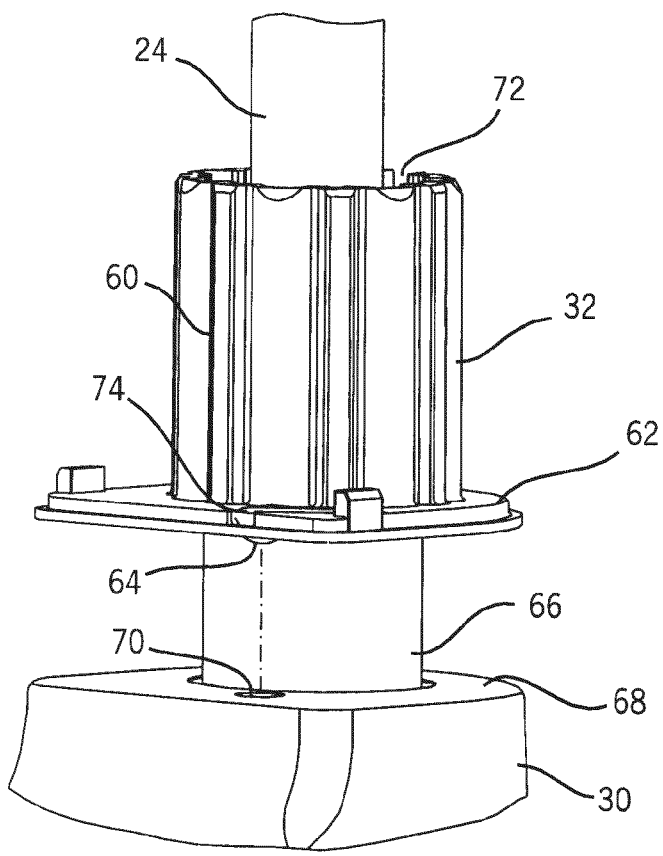
FIG. 7 is a fragmentary side elevational view of a bearing of the FIG. 2 faucet, partially mounted to a valve housing.
Figure 8:
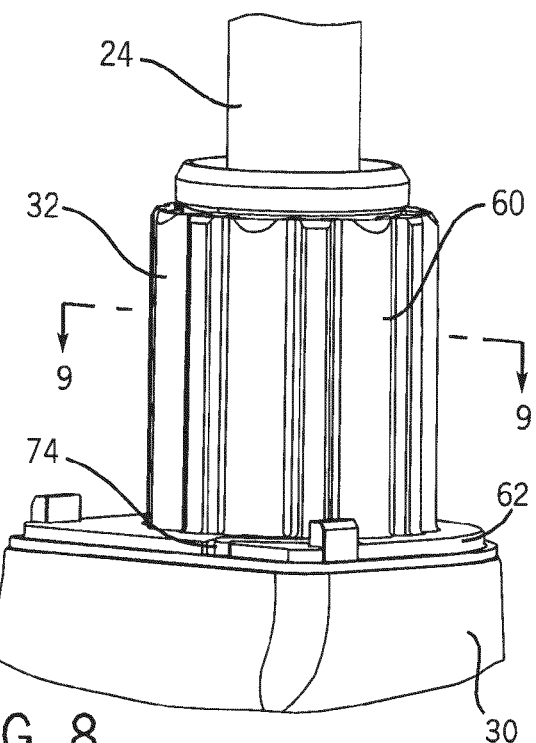
FIG. 8 is a view similar to FIG. 7, but with bearing fully mounted to the valve housing.
Figure 9:
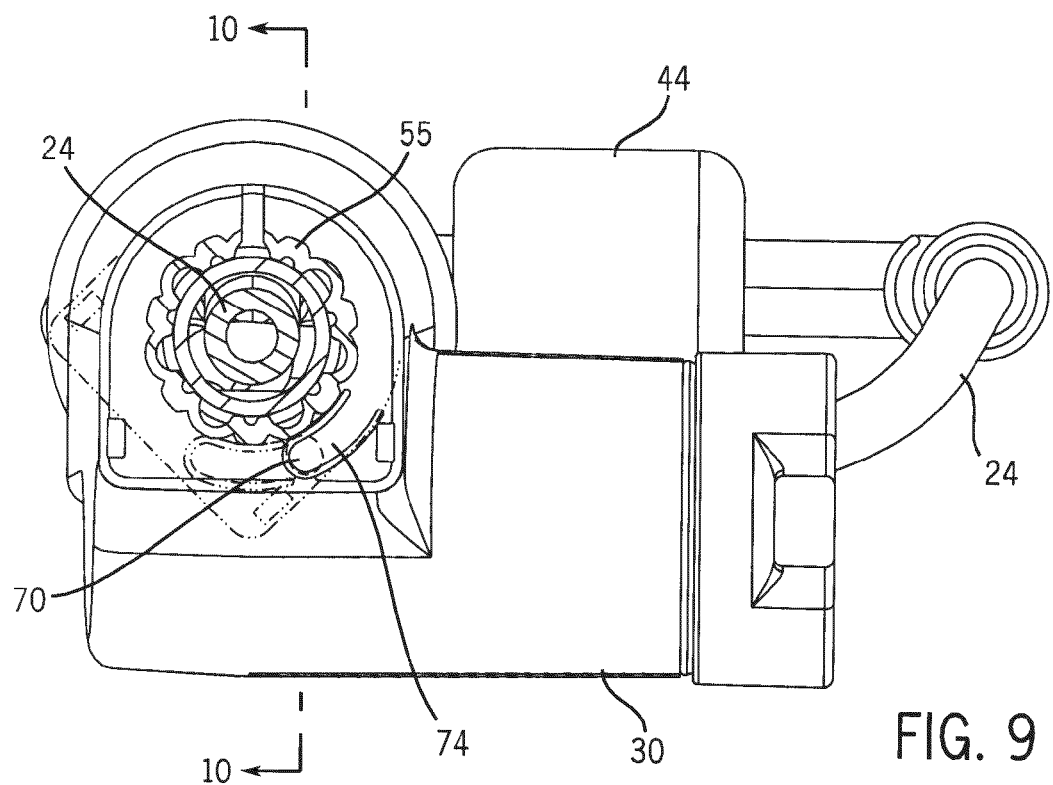
FIG. 9 is a partial cross-sectional view taken along section line 9-9 in FIG. 8.
Figure 10:
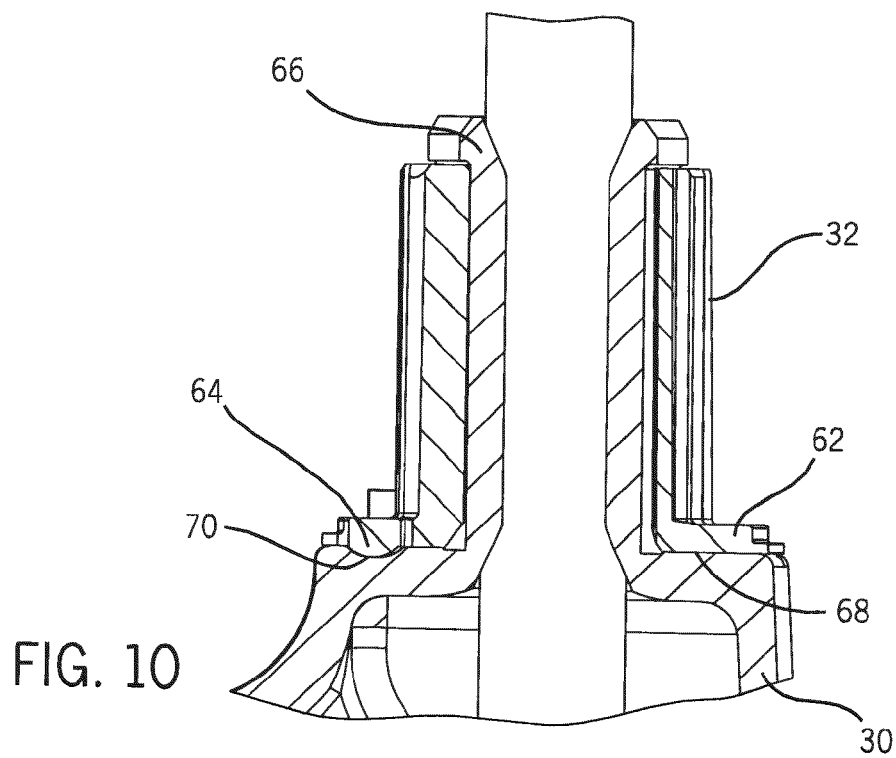
FIG. 10 is a cross-sectional view taken along section line 10-10 in FIG. 9.

Mixing valve 34 is connected to control handle 36, as also shown in FIGS. 3 and 4. Tilting and/or rotation of control handle 36 determines the combination of hot and cold water and/or the volume of water available to spray head 22 via flexible outlet line 24. The valve used for this purpose may be any of a number of conventional mixing valves.

Inlet/outlet assembly 38 (see particularly FIGS. 2, 5 and 12-14) is in fluid communication with mixing valve 34. The inlet/outlet assembly 38 has inlet lines 40 and outlet line 24 permanently affixed to a face plate 42 as by casting to integrally form them together, or by welding/brazing to essentially permanently bond them together.

It is highly preferable to form face plate 42 transverse to the longitudinal axis of inlet lines 40. Face plate 42 extends vertically without the need for a separate elbow, and each of the three lines bends from the vertical to the horizontal in a way that minimizes the need for a bulge. In this regard, it is particularly desirable that the lines have a sideways bend in them which permits a more compact front-to-back bending because part of the radius is extended side-to-side rather than just front-to-back.

One of inlet lines 40 is designed to be connected to a hot water supply and the other of inlet lines 40 is designed to be connected to a cold water supply. The inlet lines 40 are in fluid communication with the respective inputs of mixing valve 34. Flexible outlet line 24 is in fluid communication with an outlet of mixing valve 34. Appropriate movement of control handle 36 regulates the mixing of the hot and cold inputs, and can also control the flow volume, which are available to spray head 22 via flexible outlet line 24.

Flexible outlet line 24 extends downwardly from the mixing valve 34 at face plate 42, through valve housing 30, then upward back through valve housing 30, spray head harbor 26, to link to spray head 22. Flexible outlet line 24 has weight 44 slidingly adapted thereto to bias flexible outlet line 24 in a downward orientation thereby facilitating the automatic retraction of flexible outlet line 24 when spray head 22 is returned to a home position in spray head harbor 26.

As may be best appreciated from FIGS. 3 and 4, control handle 36 includes a set screw bore 46, which is treaded, which is separate, but circumferentially aligned with a visible bore 48 in an outer wall 51 of the handle. Visible bore 48 provides access to tighten a set screw 50 within set screw bore 46, which attaches an inner wall 52 of handle 36 to a valve stem 54 of mixing valve 34.

In order to control the mixing of the hot and cold inputs, and the volume of flow output from valve 34, valve stem 54 rotates and tilts. A bushing 55 is included with a keyhole shaped cutout 56 (see FIG. 2) thereby providing a greater range of motion of handle 36, without the need for an exposed cutaway in handle 36.

To further improve the decorative nature of the assembly, and also to prevent moisture from reaching the set screw connection, there can be a cap 58 which removably covers visible bore 48. It may be made of a flexible plastic. Further, as shown in FIG. 3, an O-ring seal 49 may be mounted on the cap to help keep water out from the handle interior.

Referring now mostly to FIGS. 7-10 and 15, bearing 32 has an outer contour 60 and a base 62. Outer contour 60 is mateable with an inner contour of spray head harbor 26. Base 62 includes a projection 64 mounted on a flexible arm 74.

Valve housing 30 has a tubular shaft 68 extending up from a land 68 for base 62. Land 68 has a detent/depression 70. Bearing 32 is rotatable on shaft 66 between a position where projection 64 is within detent 70 (FIG. 10), and another position where projection 64 is not within detent 70 (phantom line in FIG. 9). When the projection 64 aligns with the detent 70, the spray head harbor 26 will be perfectly aligned automatically with the valve housing below it.

Another feature of bearing 32 is that it includes a vertical slit 72 so that it can be compressed to be jammed into spray head harbor 26. Projection 64 on the bottom of bearing 32 is supported by a spring arm 74. When bump projection 64 aligns with detent 70, it therefore snaps into it, notifying the user that they have the right positioning. However, further swiveling force on the support or spray head can reinstate the swinging movement by driving the bump out of the recess. Of course, alternatively, detent 70 can be on base 62 and projection 64 can be on land 68.

The preferred embodiments of the present invention can also include a variety of other fittings, bushings, nozzles, washers, nuts and other fasteners, and other desirable plumbing components, as will be appreciated by those skilled in the art.

In a typical installation the faucet assembly 20 will be mounted on a rear mounting ledge of a double basin kitchen sink, or directly behind a multiple basin kitchen sink. Of course, the present invention could be otherwise installed in connection with other plumbing fixtures and fittings. For example, it could be used with a laundry sink.

Various other alternatives are intended within the scope of the invention. For example, in some embodiments the swivel locator could be used without the inlet/outlet assembly or the decorative handle features. In other embodiments the inlet/outlet assembly could be used without the swivel locator or the decorative handle features. In any event, the present invention is not to be limited to the features of just the most preferred embodiments.

INDUSTRIAL APPLICABILITY

The present invention provides faucets, preferably pullout spray faucets, with the capability of linking supply and outlet lines in a compact manner, attaching a decorative control handle, and having positive feel positioning for the swivel spout.

What is claimed is:

1. A faucet assembly, comprising:
a spray head harbor having an inner contour;
a bearing having an outer contour and a base, the outer contour being mateable with the inner contour of the spray head harbor, the base including one of a projection and a detent; and
a valve housing including a shaft extending from a land for the base, the land having the other of the projection and the detent;
wherein the bearing rotates on the shaft between a position where the projection is deflected in an axial direction relative to the shaft such that the projection is releasably retained within the detent and another position where the projection is not within the detent.

2. The faucet assembly of claim 1, wherein one of the projection and the detent are connected to a spring arm.

3. The faucet assembly of claim 2, wherein the spring arm is continuous with the base.

4. The faucet assembly of claim 3, wherein the base is a flange that forms a surface at a bottom of the bearing and that is positioned against the land of the valve housing.

5. The faucet assembly of claim 4, wherein the spring arm is continuous with the flange, the spring arm being coupled to the flange at a first end and being surrounded by a slot at a second end to allow the spring arm to deflect relative to the flange in the axial direction.

6. The faucet assembly of claim 5, wherein an upper portion of the bearing that defines the outer contour includes a slit for the upper portion to radially compress within the inner contour of the harbor.

7. The faucet assembly of claim 4, wherein the flange extends radially outward from the outer contour.

8. The faucet assembly of claim 2, wherein the spring arm includes the projection, and the land includes the detent.

9. The faucet assembly of claim 1, wherein the base extends radially from the outer contour.

10. The faucet assembly of claim 1, wherein an upper portion of the bearing that defines the outer contour includes a slit for the upper portion to radially compress within the inner contour of the harbor.

* * * * *